United States Patent
Duke (10) Patent No.: US 10,413,915 B2
(45) Date of Patent: Sep. 17, 2019

(54) TEAT CUP WITH NOZZLE MEANS

(71) Applicant: AN UDDER IP COMPANY LTD., Slindon, West Sussex (GB)

(72) Inventor: James Richard John Duke, Chichester (GB)

(73) Assignee: AN UDDER IP COMAPNY LTD., Slindon, West Sussex (GB)

( * ) Notice: Subject to any disclaimer, the term of this patent is extended or adjusted under 35 U.S.C. 154(b) by 217 days.

(21) Appl. No.: 15/123,881

(22) PCT Filed: Mar. 20, 2015

(86) PCT No.: PCT/GB2015/050838
§ 371 (c)(1),
(2) Date: Sep. 6, 2016

(87) PCT Pub. No.: WO2015/145116
PCT Pub. Date: Oct. 1, 2015

(65) Prior Publication Data
US 2017/0014837 A1   Jan. 19, 2017

(30) Foreign Application Priority Data

Mar. 28, 2014 (GB) .................................. 1405611.3

(51) Int. Cl.
*A01J 5/08* (2006.01)
*A01J 7/02* (2006.01)
(Continued)

(52) U.S. Cl.
CPC .............. *B05B 1/1618* (2013.01); *A01J 5/08* (2013.01); *A01J 7/025* (2013.01); *A01J 7/04* (2013.01);
(Continued)

(58) Field of Classification Search
CPC ..... A01J 7/025; A01J 5/08; A01J 7/04; B05B 1/3006
(Continued)

(56) References Cited

U.S. PATENT DOCUMENTS 2,731,300 A   1/1956  Jansen
3,545,488 A * 12/1970 Venus, Jr. .............. B65D 83/36
                                              137/590

(Continued)

FOREIGN PATENT DOCUMENTS

WO   WO 2005/072516 A1   8/2005
WO   WO 2007/031783 A1   3/2007

OTHER PUBLICATIONS

International Searching Authority, International Search Report and Written Opinion for International Application No. PCT/GB2015/050838, dated Jun. 12, 2015, 9 pages, European Patent Office, Netherlands.

*Primary Examiner* — Marc Burgess
(74) *Attorney, Agent, or Firm* — Alston & Bird LLP (57) ABSTRACT

There is provided a teat cup (1) comprising a flexible liner (3) for engaging about a teat of an animal to be milked. The liner has a head portion (7) at one end of the liner and a milk discharge passageway (12) at another end of the liner. The head portion is provided with a mouth (9) through which the teat is engageable with the liner, and an injector (18) for injecting fluid into the head portion of the liner. The injector comprises a gravity biased diverter that controls, based on an orientation of the teat cup, an injection direction (FLT, FLF) in which the fluid is injected into the head portion. There is further provided a method for milking an animal using the teat cup.

14 Claims, 5 Drawing Sheets

(51) Int. Cl.
*A01J 7/04* (2006.01)
*B05B 1/16* (2006.01)
*B05B 1/30* (2006.01)
*F16K 1/44* (2006.01)
*F16K 15/04* (2006.01)

(52) U.S. Cl.
CPC .............. *B05B 1/3006* (2013.01); *F16K 1/44* (2013.01); *F16K 15/044* (2013.01)

(58) Field of Classification Search
USPC .................. 119/14.02; 137/38, 103; 222/496
See application file for complete search history.

(56) References Cited

U.S. PATENT DOCUMENTS

| | | | | |
|---|---|---|---|---|
| 3,985,301 | A * | 10/1976 | Tindall | B05B 7/1254 239/126 |
| 4,392,507 | A * | 7/1983 | Harris | B60K 15/03519 137/38 |
| 5,346,104 | A * | 9/1994 | Jeong | B65D 83/36 137/38 |
| 7,263,948 | B2 * | 9/2007 | Ericsson | A01J 7/025 119/14.18 |
| 7,793,864 | B2 * | 9/2010 | Decarne | B05B 3/0427 134/166 C |
| 8,210,123 | B2 * | 7/2012 | Duke | A01J 5/08 119/14.49 |
| 8,240,272 | B2 * | 8/2012 | Duke | A01J 5/048 119/14.02 |
| 9,801,352 | B2 * | 10/2017 | Maier | A01J 7/025 |
| 9,820,468 | B2 * | 11/2017 | Van Den Berg | A01J 5/017 |
| 2005/0045108 | A1 * | 3/2005 | Wipperfurth | A01J 5/08 119/14.49 |
| 2006/0090792 | A1 * | 5/2006 | Tamian | F16K 17/366 137/38 |
| 2006/0261098 | A1 * | 11/2006 | Nilsson | B65D 25/48 222/496 |
| 2008/0202433 | A1 * | 8/2008 | Duke | A01J 5/08 119/14.49 |
| 2009/0165724 | A1 | 7/2009 | Mader et al. | |

\* cited by examiner

TEAT CUP WITH NOZZLE MEANS

CROSS REFERENCE TO RELATED APPLICATIONS

This application is a National Stage Application, filed under 35 U.S.C. § 371, of International Application No. PCT/GB2015/050838, filed Mar. 20, 2015, which claims priority to United Kingdom Application No. 1405611.3, filed Mar. 28, 2014; the contents of both of which are hereby incorporated by reference in their entirety.

BACKGROUND

Related Field

The present invention relates to teat cups for animal milking equipment and, more particularly, to such teat cups enabling the application of treatment fluids to animal's teats and flushing fluid to clean the teat cups after milking.

Description of Related Art

Conventionally, milking equipment installed in a milking parlor comprises a milking point at each animal stall within the parlor. Each milking point includes a milking cluster of teat cups for connecting the equipment to the teats of an animal to be milked. In the case of cows, for example, each milking cluster has four teat cups.

Each teat cup comprises a hollow shell supporting a flexible liner which has a barrel portion for engaging about a teat and, at its upper end, has a head portion with a mouth through which the teat is engaged with the barrel of the liner. At the opposite, discharge end of the teat cup, the liner communicates with a flexible, short milk tube connected to a, so called, clawpiece of the cluster where the milk extracted from the animals teats is collected and delivered, via a flexible, long milk tube, to the collection vessel of the equipment.

Upon commencement of milking, a vacuum is applied to the teat cups, via the long milk tube, the clawpiece and the short milk tubes, for the purposes of extracting milk from the teat cups. This vacuum also leaks between the barrel of the liner and the engaged teat and is applied to a void formed about the teat in the head of the liner in order to capture the cup on the teat. Milking is achieved by automatically and alternately applying vacuum and atmospheric pressure pulses to the space between the shell and the liner of each teat cup in order to flex the liner and stimulate discharge of milk from the engaged teat. It is customary to apply these pneumatic pulses either simultaneously to the teat cups of a cluster or alternately to pairs of the teat cups. The clawpiece includes a distributor for distributing the pneumatic pulses to the individual teat cups, via flexible pneumatic lines or tubes.

After the flow of milk drops below a predetermined level, the milking cycle is considered to be complete, and treatment fluid including fluids such as iodine and emollients are injected into the heads of the liners to coat the animal's teats and help prevent teat infections. Each teat cup may be fitted with one or more injection nozzles for injecting the treatment fluid into the heads of the liners. The treatment fluid is fed to the injection nozzles via a distributor of the clawpiece Then, the milking cluster at the milking point is withdrawn from the animal's teats (commonly referred to as "take-off") by an automatic cluster remover or manually. Next, in a cleansing cycle, the teat cups are flushed internally with disinfectant and water and are dried with compressed air preparatory to use on the next animal to be milked.

Upon take-off, the milking cluster is designed to enable the short milk tubes to fall away from the centreline of the cluster so that the teat cups are inverted and hang with their heads downwardly from the clawpiece. Flushing is performed with the teat cups in this inverted position. Consequently liquid can escape through the head portions of the teat cups. The short milk tubes are connected to the clawpiece via spigots which are designed to cause the short milk tubes to be shut off at the spigots when the teat cups fall into their inverted position, so as to avoid entry of treatment fluid into the clawpiece and downstream milk tubes.

The commonly assigned patent publication WO 2007/031783 discloses a teat cup similar to that described above, wherein the injection nozzles of the teat cup are downwardly directed in order to assist flushing of the teat cups during the cleansing cycle. Specifically, since the teat cups are inverted during the cleansing cycle, the downwardly directed nozzles fire the disinfectant and water upwardly into the teat cups to improve the flushing of the teat cup.

However, although the downwardly directed nozzles improve the flushing of the teat cup, when the downwardly directed nozzles are used to supply the treatment fluid to the teats, the treatment fluid may not always reach up to the tops of the animal's teats unless a larger quantity of treatment fluid is supplied.

BRIEF SUMMARY

According to a first aspect of the invention, there is provided a teat cup comprising a flexible liner for engaging about a teat of an animal to be milked. The liner has a head portion at one end of the liner and a milk discharge passageway at another end of the liner. The head portion is provided with a mouth through which the teat is engageable with the liner, and an injector for injecting fluid into the head portion of the liner. The injector comprises a gravity biased diverter that controls, based on an orientation of the teat cup, an injection direction in which the fluid is injected into the head portion.

Since the injector comprises a gravity biased diverter, the fluid can be injected into the head portion of the teat cup in an injection direction which is dependent on the orientation of the teat cup, to help maximise the effectiveness of whichever fluid is being injected into the teat cup. Specifically, fluids which are injected whilst the teat cup is connected to the teat can be sent in a different direction to fluids which are injected when the teat cup has been withdrawn from the teat.

The control of the injection direction in which the fluid is injected into the head portion may comprise switching the injection direction between first and second directions, the switching based on which way up the teat cup is orientated.

For example, the gravity biased diverter may be configured to divert the fluid to a first nozzle that points horizontally towards the teat when the teat cup is in a normal orientation with the mouth above the milk discharge passageway, such as when treatment fluid needs to be supplied to the teat at the completion of the milking cycle, and to divert the fluid to a second nozzle that points towards the milk discharge passageway when the teat cup is in an inverted orientation with the mouth below the milk discharge passageway, such as when flushing fluid needs to be supplied to flush the liner after milking.

The injector enables the (treatment) fluid at the end of the milking cycle to be directed towards the teat in the first direction to provide effective coverage of the teat, for example in a horizontal direction or a direction towards the mouth of the liner, and enables the (flushing) fluid to be directed in the second direction for effective cleansing of the liner after milking, for example in a direction towards the milk discharge passageway of the liner.

Directing the treatment fluid in a horizontal direction helps create more fluid turbulence at an opposite side of the head portion from the injector, improving all-round coverage of the teat, and making more economical use of the treatment fluid.

After the fluid has left the injector the direction of the fluid may be moderated by gravity, or the fluid may bounce off the teat/liner in a range of different directions. However, the primary injection direction at which the fluid is initially injected by the injector is the subject of this invention, rather than any later changes in direction that may occur to the fluid after the fluid has already been injected.

The gravity biased diverter may comprise a valve element which moves under the influence of gravity to selectively unblock one of a first passageway to the first nozzle and a second passageway to the second nozzle, to control which passageway and therefore which direction the fluid is injected into the head portion.

The valve element may be a ball which moves under the influence of gravity between a first valve seating at an entrance to the first passageway and a second valve seating at an entrance to the second passageway. The ball is preferably made of a relatively heavy material such as metal or ceramic so that it responds well to gravity, and the ball shape enables the ball to easily move between the first and second valve seatings.

Advantageously, the ball may be retained in diverter valve cavity having the first and second valve seatings at opposing ends of the diverter valve cavity, and path(s) may be provided for fluids to enter the diverter valve cavity substantially mid-way between the first and second valve seatings. Furthermore, the length of the diverter valve cavity between the first and second valve seatings may be less than twice the diameter of the ball so that fluid entering the diverter valve cavity via the path tends to force the ball even harder against whichever one of the first and second valve seats it is currently resting against. Preferably, the paths are arranged symmetrically to one another about the ball so that the ball is not unsettled from whichever valve seat it is currently resting against by fluids entering from the paths.

The first direction may make a first angle with a central axis of the liner, and the second direction may make a second angle with the central axis of the liner, wherein the central axis of the liner runs from the mouth to the milk discharge passageway, and wherein the first angle is larger than the second angle. Accordingly, the first direction may be more suited to directing fluid to an animal's teat and the second direction may be more suited to directing fluid towards the milk discharge passageway of the liner for cleaning the liner.

At least one of the first and second nozzles may comprise a plurality of exit holes through which the fluid is injected, to improve the distribution of fluid within the liner. The plurality of exit holes for the first nozzle preferably all inject fluid in directions having the first angle to the central axis, and the plurality of exit holes for the second nozzle preferably all inject fluid in directions having the second angle to the central axis. Exit holes that inject fluid at different angles to the central axis to one another may be considered as different nozzles.

Advantageously, the exit holes of each plurality of exit holes (nozzle) may be spaced apart from one another along a circumference around the central axis.

Then, the exit holes of each nozzle inject the fluid from different points around the circumference of the central axis, to improve coverage of the teat/liner by the fluid.

The teat cup may further comprise a fluid delivery tube that is connected to the injector and which allows fluid delivery to the injector, and a non-return valve mounted in the injector which controls the fluid delivery from the fluid delivery tube. The non-return valve may comprise a return spring that is rated to admit the fluid to the gravity biased diverter when greater than a predetermined fluid pressure differential occurs between the head portion of the liner and the fluid delivery tube. The return spring helps prevent the vacuum in the head portion of the liner from sucking fluid up from the fluid delivery tube during the milking cycle. Also, the return spring helps avoid cross-coupling via fluid delivery lines of the vacuum occurring in the head portion of one teat cup with the vacuum occurring in the head portion of another teat cup.

Advantageously, the injector may comprise a housing having the gravity biased diverter and the non-return valve, the non-return valve mounted at an inlet of the injector where the fluid delivery tube is connected to the injector. The liner of a teat cup requires regular replacing, and the installation of the non-return valve in the injector enables simple replacement of the injector with the liner.

The injector may comprise a moulded plastics housing, and may be an interference fit in a preformed cavity in the liner which is typically made from resilient plastics, synthetic resin or silicone.

The teat cup may comprise a shell in which the liner of the teat cup is supported, and the fluid delivery tube may be mounted internally of the shell and extend from an external inlet port or nipple on the shell adjacent the discharge end of the teat cup to the injector at the head portion of the liner.

The construction may be such that the inlet of the injector is engageable with the end of the delivery tube as the liner is fitted to the shell. The inlet of the injector may incorporate suitable sealing means, such as a rubber bung into which the end of the delivery tube can be inserted to both grip the delivery tube and form a seal. Alternatively, sealing means such as O-rings could be used.

Preferably, the shell is moulded from plastics material and the delivery tube, which may be stainless steel, is disposed in a groove moulded in an internal sidewall of the shell. Advantageously, the delivery tube may be substantially housed within the wall of the shell so that the delivery tube does not interfere with the liner whilst milking with consequent risk of contact between the liner and delivery tube.

According to a second aspect of the invention, there is provided a method of milking an animal using the teat cup of the first aspect. The method comprises applying the teat cup to a teat of an animal, applying a vacuum to the liner via the milk discharge passageway during a milking cycle to aid extraction of milk, injecting treatment fluid into the head portion via the injector once the milking cycle has been completed, withdrawing the teat cup from the teat and allowing the teat cup to fall into an inverted position with the head portion beneath the milk discharge passageway, and injecting flushing fluid via the injector into a barrel portion of the liner between the head portion and the milk discharge passageway when the teat cup is in the inverted position.

BRIEF DESCRIPTION OF THE FIGURES

Embodiments of the invention will now be described by way of example only and with reference to the accompanying drawings, in which.

DETAILED DESCRIPTION OF VARIOUS EMBODIMENTS

The drawings are not to scale, and same or similar reference signs denote same or similar features.

Figure 1:
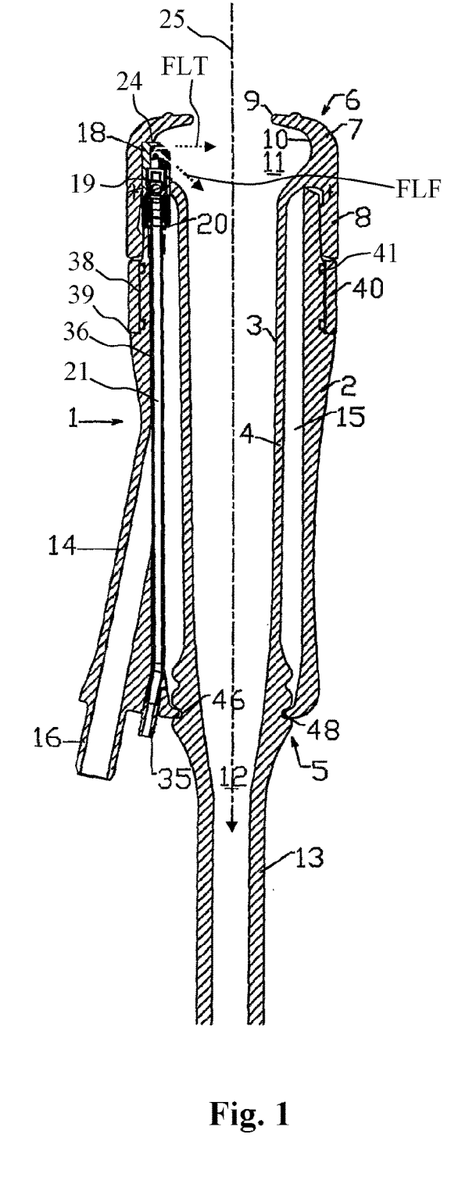
FIG. 1 shows a schematic side diagram of a teat cup according to an embodiment of the invention.
Figure 2:
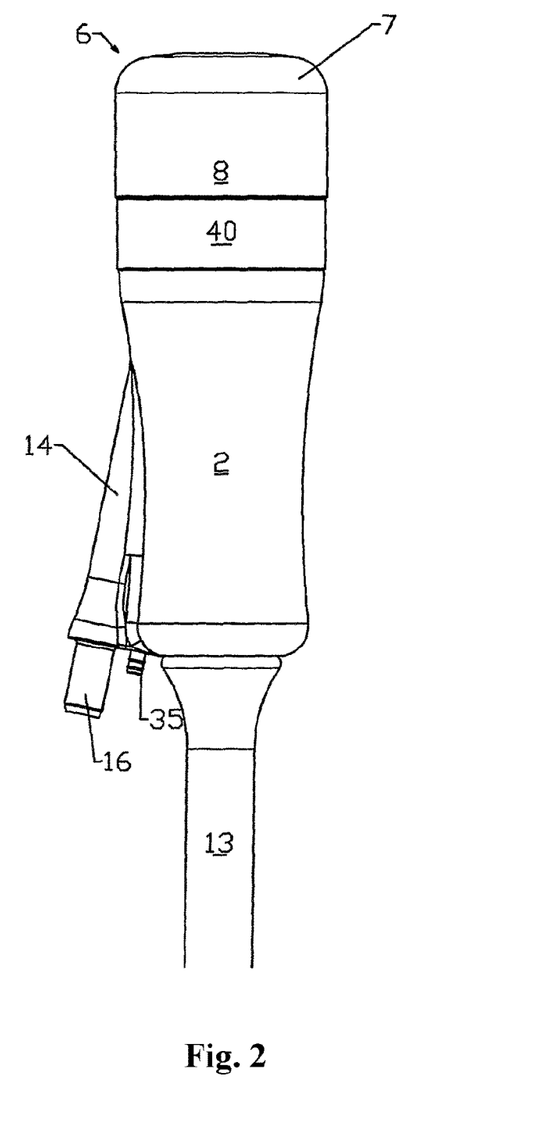
FIG. 2 shows a schematic cross-sectional diagram taken along a central axis of the teat cup of FIG. 1.

The teat cup illustrated in FIG. 1 and FIG. 2 of the accompanying drawings is one of four similar teat cups of a milking cluster used for milking a cow and which is connected to milking equipment. Each teat cup 1 comprises a hollow generally cylindrical shell 2 supporting a flexible liner 3 in spaced relation with the shell. As viewed in FIGS. 1 and 2, the liner has a cylindrical barrel portion 4 sealed to the shell adjacent the bottom, discharge end 5 and adjacent the top or head end 6 of the cup. At the latter end, the liner has a head portion 7 which engages, via a skirt portion 8, about the outside of the shell in order to seal the shell to the head end of the barrel, and which projects above the adjacent end of the shell. The head 7 of the liner is formed with a mouth 9 permitting access to the interior of the liner.

Between the top of the barrel 4 of the liner and the mouth 9, the head of the liner is formed with an internal annular cavity 10 which, when an animal's teat is inserted into the cup through the mouth 9, forms a void or space 11 between the side of the teat and the head. The teat cup has a central axis 25 along the length of the teat cup, between the head portion 7 and the discharge end 5 of the teat cup, and the teat is typically aligns with the central axis 25 when in the teat cup .

At the discharge end 5 of the teat cup, the liner has a discharge passageway 12 communicating with a flexible, short milk tube 13 which connects the teat cup to a clawpiece (not shown) of the milking cluster and via which vacuum is applied to the inside of the liner for removing, from the cup, milk discharged by the teat during the milking cycle. The shell 2 may be moulded from rigid plastics material whilst the liner 3 may be moulded from resilient plastic, synthetic rubber or silicone.

Integrally moulded with the shell is an inlet tube 14 for connecting the space 15 between the shell 2 and the liner 3, via the clawpiece, to a suitable source for alternately supplying vacuum pulses and venting the space 15 to atmosphere in order to cause the liner to flex against the teat and stimulate milking of an animal to which the teat cup is fitted. The inlet tube has a spigot 16 at its inlet end to which is attached a flexible pipe (not shown) coupling the inlet tube to the clawpiece.

Mounted on the inside of the head portion of the liner is an injector 18 for injecting fluid into the cavity 10 in the head portion of the liner. The injector 18 comprises a non-return valve 19 for controlling delivery of fluid into the injector, and a coupling 20 for connecting a fluid delivery tube 21 to the injector. The injector is mounted to the shell 2 and protrudes through the liner to the inside of the head portion 7. It is prevented from moving upwardly in the head portion by a shoulder 24 adjacent the mouth of the liner and it is also indexed in predetermined alignment with the teat cup.

The injector 18 is supplied with fluid, via the non-return valve 19, by the delivery tube 21 which is mounted internally of the shell 2 and connects a fluid inlet spigot 35 adjacent the discharge end 5 of the teat cup to the inlet of the injector 18. The fluid inlet spigot 35 is moulded integrally with the shell juxtaposed and on the inside of the inlet passage 14. Downstream of the inlet spigot, the delivery tube snaps into a part-circular groove 36 moulded along the inside wall of the shell 2. The arrangement is such that the radial inner surface of the delivery tube is substantially flush with the inside surface of the shell 2 so as not to interfere with the flexing motion of the liner 3 during milking. The delivery tube is conveniently moulded from stainless steel.

Mounted on the outside of the shell in an annular recess 38 formed between the bottom edge of the skirt 8 and an annular shoulder 39 moulded on the outside of the shell is a cylindrical weight 40 which assists in causing the lightweight plastic teat cups to fall into an inverted position with their heads downwardly upon take-off of the milking cluster. The cylindrical weight 40 is preferably made from stainless steel and is sealed to the outside of the shell by O-rings 41 retained in annular grooves moulded in the outside of the shell.

The construction of the teat cup facilitates its assembly, and replacement of the liner 3 when necessary, and also, replacement of the cylindrical weight 40 to suit specific requirements of milking if more or less weight is required. Hence, the shell 2 is supplied with the delivery tube 21 mounted in the groove 36 along the inside of the shell. On assembly, the appropriate cylindrical weight is mounted about the outside of the shell, over the O-rings 41 and against the moulded shoulder 39 and then the liner is assembled to the shell.

The liner 3 is assembled by fitting the discharge end of the liner through the shell 2 from its head end. As the skirt portion 8 of the head of the liner engages about the head end of the shell, the adjacent end of the delivery tube 21 is automatically inserted into the inlet opening of the injector 18. The inlet end of the delivery tube may be chamfered to facilitate entry into the inlet of the injector.

When the liner is fully fitted in position with an annular groove 46 in the discharge end of the liner engaging the bottom edge 48 of the shell 2, the bottom end of the skirt 8 abuts the upper end of the cylindrical weight 40 so as to retain this firmly in position.

Figure 3:
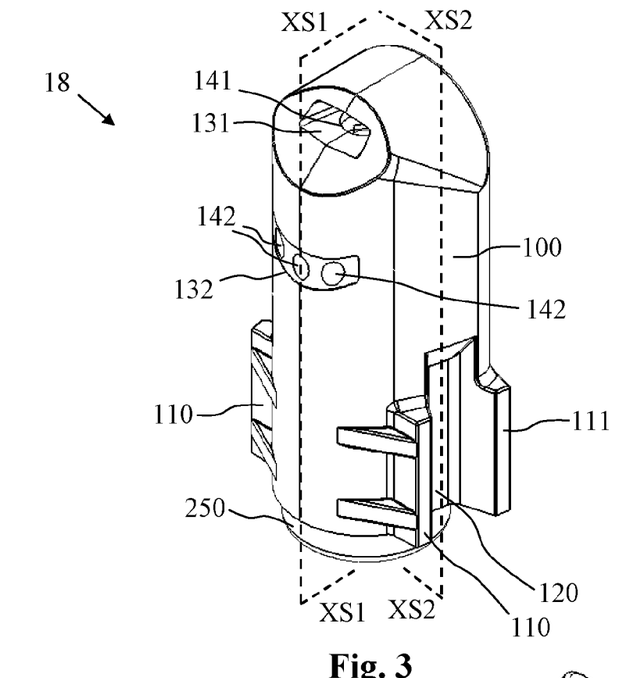
FIG. 3 shows a schematic perspective diagram of an injector forming part of the teat cup of FIG. 1.

The injector 18 will now be described in more detail with reference to the schematic diagrams of FIG. 3-FIG. 7. FIG. 3 shows a perspective diagram of the injector 18, which comprises a housing 100 having a lower end where fins 110, 111 are located and an upper end where nozzles 131 and 132 are located. There are four fins arranged in two pairs, each pair having one fin 110 and one fin 111 which are spaced apart from one another to define a groove 120. Each groove 120 is aligned along a length of the injector 18, the length being between the upper and lower ends. The grooves 120 oppose one another, and allow the injector 18 to be slotted into a slot formed in the end of the shell 2 nearest the head portion of the liner 3. This keeps the injector in the same orientation as the shell and therefore the teat cup.

The nozzles comprises a first nozzle 131 for injecting fluid substantially horizontally into the head portion 7 of the teat cup, and a second nozzle 132 for injecting fluid downwardly towards the milk discharge passageway 12 of the teat cup. The fluid from the first nozzle 131 is illustratively shown in FIG. 1 as fluid FLT, and the fluid from the second nozzle 132 is illustratively shown in FIG. 1 as fluid FLF. The top part of the injector 18 engages through a hole in the liner 3 so that the first and second nozzles are inside the head portion 7 of the liner.

The first nozzle 131 has a single exit hole 141 through which the fluid FLT exits, and the second nozzle 132 has three exit holes 142 through which the fluid FLF exits. The three exit holes 142 are spaced apart from one another along a circumference around the central axis 25, and inject fluid in diverging directions to strike different parts of the animal's teat around a circumference of the animal's teat. The diverging directions all make substantially the same angle with the central axis 25. Clearly, the number of exit holes for each nozzle may vary in alternate embodiments, and more than two nozzles may be provided in some embodiments to direct fluids in a variety of differing directions.

Figure 4:
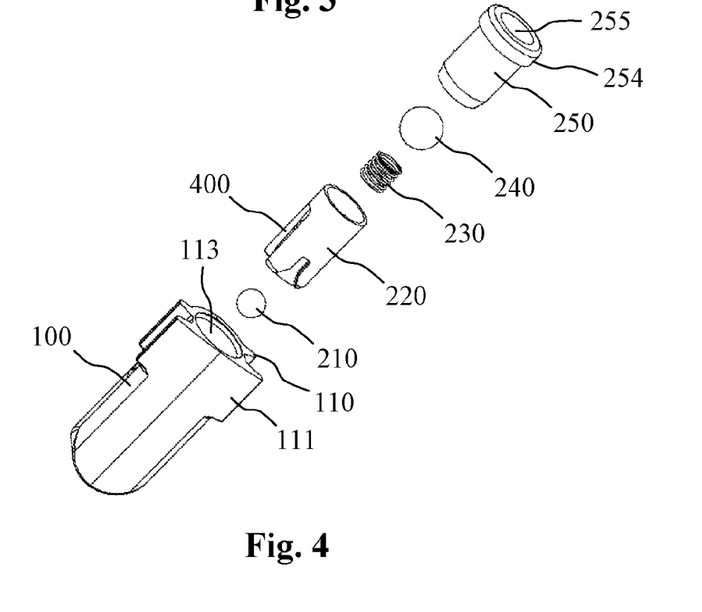
FIG. 4 shows a schematic exploded diagram of the injector of FIG. 3.

The exploded diagram of FIG. 4 shows the constituent parts of the injector 18, specifically the housing 100, a diverter valve ball 210, an insert 220, a return spring 230, a non-return valve ball 240, and a bung 250. The housing 100 and the insert 220 are moulded from a rigid plastics material. The diverter valve ball 210, return spring 230, and non-return valve ball 240 are formed of stainless steel, and the bung 250 is moulded from rubber.

To fit the various parts of the injector 18 together, the non-return valve ball 240 is connected to the insert 220 by the return spring 230. Then, the diverter ball valve 210 is dropped into a cylindrical cavity 113 within the housing 100, and the insert 220 is slid into the cylindrical cavity 113 behind the diverter valve ball. The insert 220 and the end of the cylindrical cavity 113 together define a diverter valve cavity 310 (see FIG. 5) within which the diverter ball valve 210 is free to move. The diverter valve cavity 310 and the diverter ball valve 210 together constitute a gravity biased diverter. Finally, the rubber bung 250 is pushed into the cylindrical cavity 113 until a base 254 of the rubber bung abuts against the entry to the cylindrical cavity 113.

Figure 5:
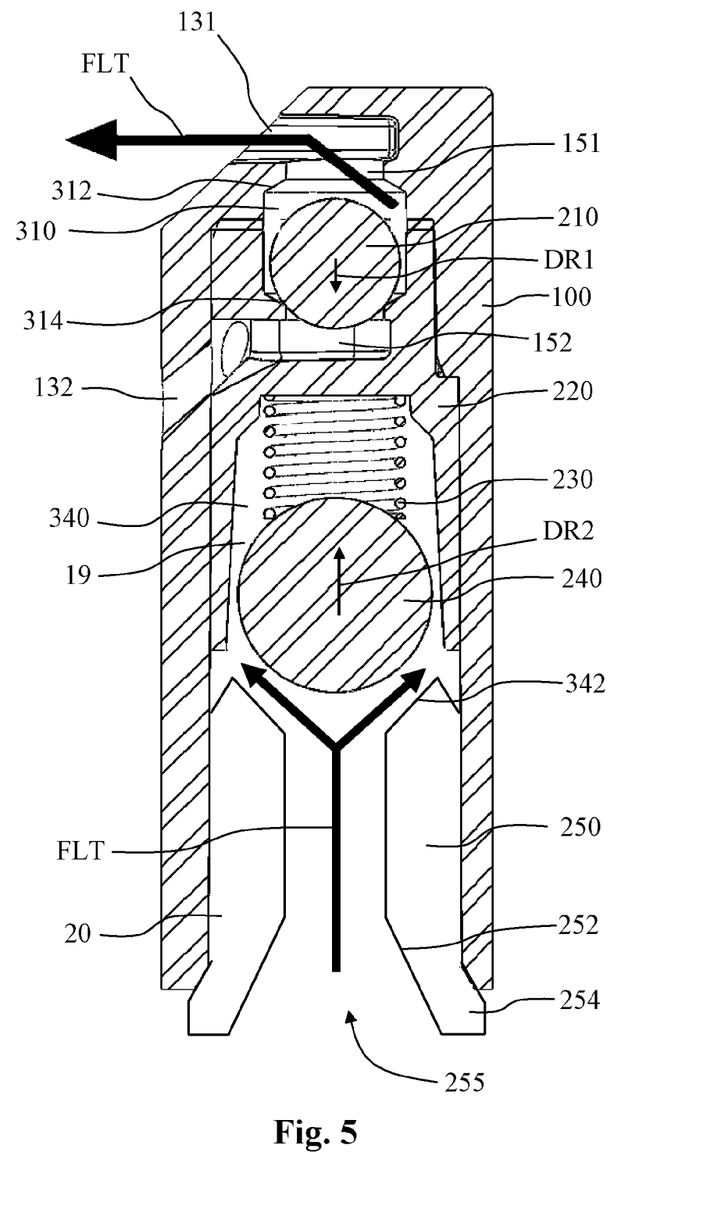
FIG. 5 shows a schematic cross-sectional diagram of the injector of FIG. 3 when being used to deliver treatment fluid.
Figure 6:
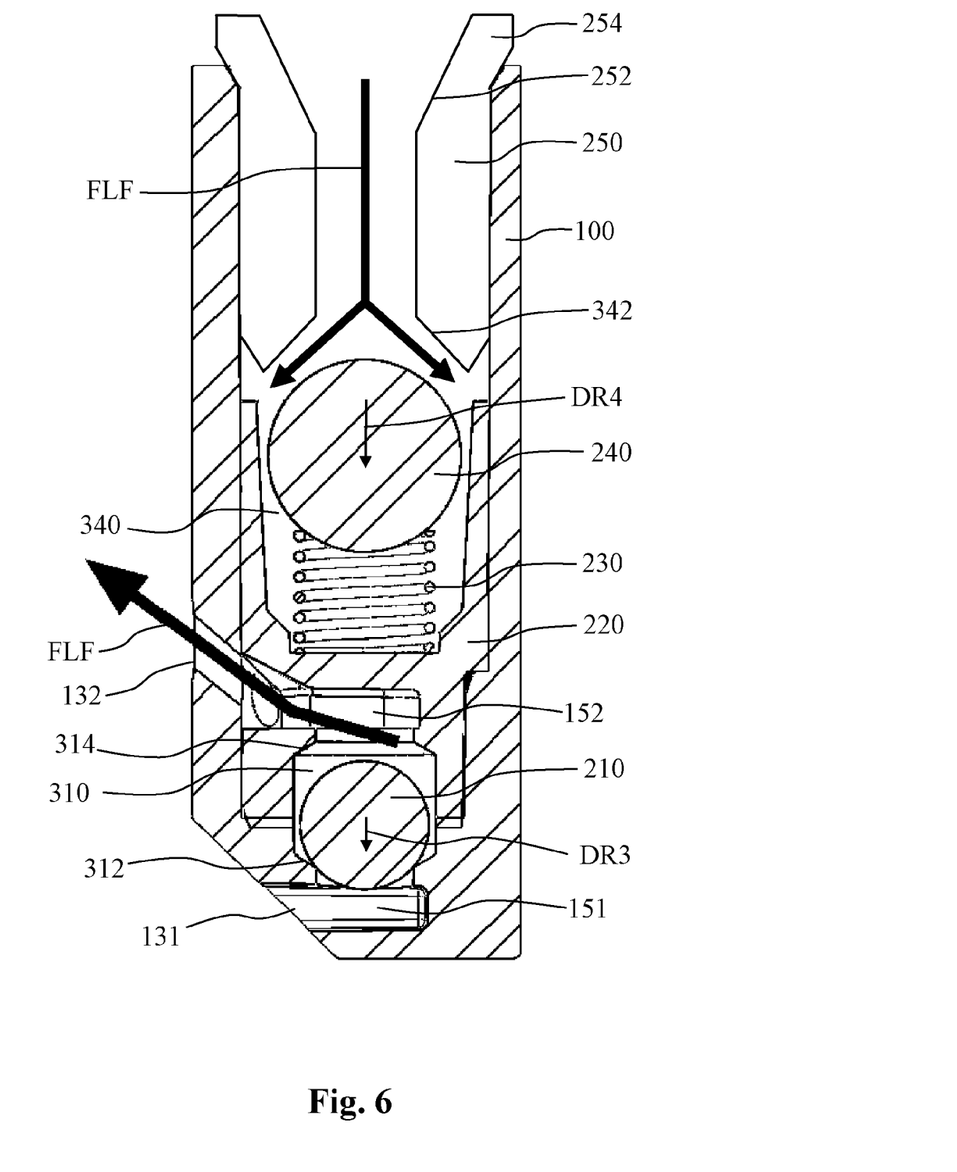
FIG. 6 shows a schematic cross-sectional diagram of the injector of FIG. 3 when being used to deliver flushing fluid.

Two cross-sectional views of the assembled injector 18 are shown in FIG. 5 and FIG. 6. These cross-sectional views are both taken looking in from plane XS1 marked on FIG. 3. First referring to FIG. 5, the injector 18 is shown in a normal orientation corresponding to when the mouth of the teat cup is above the milk discharge passageway. Such an orientation corresponds to the orientation of the teat cup when the teat cup is attached to an animal's teat for milking.

It can be seen on FIG. 5 that the diverter valve cavity 310 contains the diverter ball valve 210. The diverter valve cavity 310 comprises a first valve seating 312 leading to a first passageway 151, and a second valve seating 314 leading to a second passageway 152. The first passageway 151 leads to the exit hole of the first nozzle 131, and the second passageway 152 leads to the exit holes of the second nozzle 132.

Since the injector 18 is in the normal orientation, the diverter ball valve 210 has moved in the direction DR1 under the influence of gravity, to abut against the second valve seating 314, and prevent fluid in the diverter valve cavity 310 from entering the second passageway 152. Accordingly, any fluid that enters the diverter valve cavity 310 is forced to exit the diverter valve cavity 310 via the first passageway 151 and the first nozzle 131, rather than the second passageway 152 and second nozzle 132.

The rubber bung 250 comprises an inlet 255 which forms the coupling 20 for connecting the delivery tube 21 (refer to FIG. 1). The inlet 255 comprises an entrance funnel 252 to ease the insertion of the delivery tube 21 into the inlet 255.

When the delivery tube 21 has been inserted into the inlet 255, the inlet 255 grips the delivery tube and forms a seal therewith to prevent leakage of fluids supplied by the delivery tube 21.

The rubber bung also comprises a valve seating 342 at an end of the inlet 255 opposite the entrance funnel 252. The valve seating 342 forms part of a non-return valve cavity 340 that is defined by a space inside the cylindrical cavity 113 between the insert 220 and the rubber bung 250. The non-return valve cavity 340 together with the return spring 230, non-return valve ball 240, and rubber bung 250, forms the non-return valve 19. The return spring 230 biases the non-return valve ball 240 towards the valve seating 342, such that the non-return valve ball 240 normally presses against the valve seating 342 to keep the inlet 255 closed.

As illustrated in FIG. 5, when the fluid delivery tube supplies fluid FLT to the injector 18, the fluid FLT pushes the non-return ball valve 240 in a direction DR2 against the spring bias of the return spring 230, lifting the non-return ball valve 240 from the valve seat 342 and allowing the fluid FLT to enter the non-return valve cavity 340. Although not visible in FIG. 5, the insert 220 comprises a slot 400 (see FIGS. 4 and 7) which provides a path for fluids from the non-return valve cavity 340 to the diverter valve cavity 310. Accordingly, the fluid FLT reaches the diverter valve cavity 310 and is diverted to the first passageway 151 by the diverter valve ball 210, which is blocking off the second passageway 152 by virtue of the orientation of the injector 18 and teat cup 1. The fluid FLT moves through the first passageway 151 and exits the first nozzle 131 substantially perpendicular to the length of the housing 100 and the central axis 25.

Since the injector 18 and teat cup 1 are in the normal orientation at the end of the milking cycle, the fluid FLT is treatment fluid that is delivered to the injector 18 by the delivery tube 21, and that is directed horizontally towards the teat of the animal from the first nozzle 131 by the injector 18.

Now referring to FIG. 6, the injector 18 is shown in an inverted orientation corresponding to when the milk discharge passageway of the teat cup is above the mouth. Such an orientation corresponds to the orientation of the teat cup once the teat cup has been withdrawn from the teat and allowed to fall into an inverted position.

Since the injector 18 is in the inverted orientation, the diverter ball valve 210 has moved in the direction DR3 under the influence of gravity, to abut against the first valve seating 312, and prevent fluid in the diverter valve cavity 310 from entering the first passageway 151. Accordingly, any fluid that enters the diverter valve cavity 310 is forced to exit the diverter valve cavity 310 via the second passageway 152 and the second nozzle 132, rather than the first passageway 151 and first nozzle 131.

As illustrated in FIG. 6, when the fluid delivery tube supplies fluid FLF to the injector 18, the fluid FLF pushes the non-return ball valve 240 in a direction DR4 against the spring bias of the return spring 230, lifting the non-return ball valve 240 from the valve seat 342 and allowing the fluid FLT to enter the non-return valve cavity 340.

The fluid FLF travels from the non-return valve cavity 340 to the diverter valve cavity 310 via the slot 400 (see FIG. 4 and FIG. 7), and is diverted to the second passageway 152 by the diverter valve ball 210, which is blocking off the first passageway 151 by virtue of the orientation of the injector 18 and teat cup 1. The fluid FLF moves through the second passageway 152 and exits the second nozzle 131 in a direction towards the milk discharge passageway, since the second nozzle 131 points towards the milk discharge passageway.

Since the injector 18 and teat cup 1 are in the inverted orientation after the teat cup has been withdrawn from the animal's teat, the fluid FLF is flushing fluid that is delivered to the injector 18 by the delivery tube 21, and that is directed upwardly towards the milk discharge passageway of the teat cup, to help cleanse the barrel of the liner 3.

Figure 7:
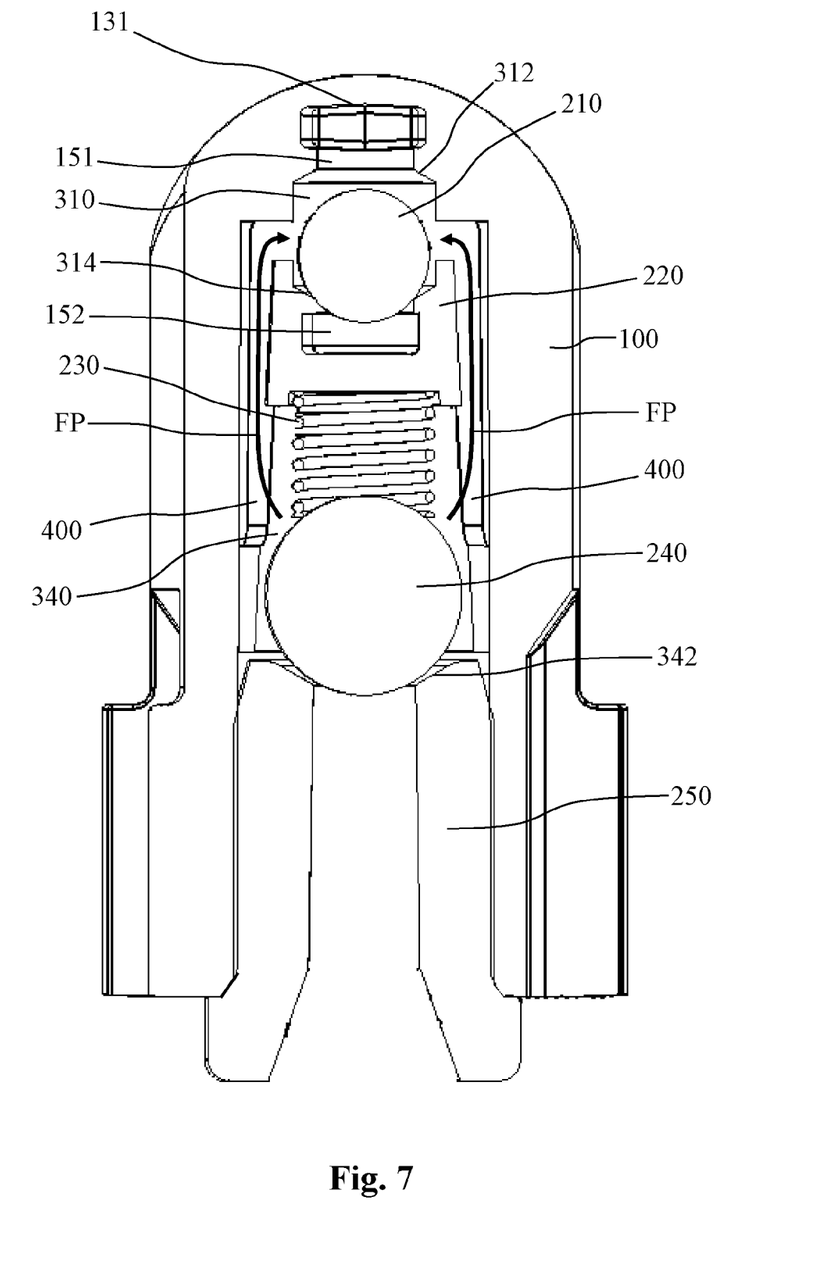
FIG. 7 shows another schematic cross-sectional diagram of the injector of FIG. 3 when no fluids are being delivered.

Another cross-sectional view of the assembled injector 18 is shown in FIG. 7, which shows a view looking in from plane XS2 marked on FIG. 3. In this view, the non-return valve is show in its rest position where the delivery tube 21 is not supplying any fluid, so that the non-return valve ball 240 is fully urged against the valve seat 342 by the return spring 230, to prevent any back-flow of fluids from the non-return valve cavity 340 into the delivery tube 21.

Furthermore, in FIG. 7 the paths FP that fluids take between the non-return valve cavity and the diverter valve cavity are visible. The paths FP are provided by slots 400 positioned on opposing sides of the insert 220, such that they are symmetrical with one another about the diverter valve ball 220. One of the slots 400 is visible in FIG. 4. It can be seen that the paths FP open into the diverter valve cavity 310 substantially mid-way between the first and second valve seatings 312 and 314. Since the length of the diverter valve cavity 310 between the first and second valve seatings 312 and 314 is less than twice the diameter of the diverter valve ball 220, any inflow of fluid into the diverter valve cavity 310 via the paths FP will impact the diverter valve ball 220 and tend to force the diverter valve ball 220 even harder against whichever one of the first and second valve seatings it is currently resting against, helping to assure that the diverter valve ball prevents any leakage of fluid into the wrong nozzle.

The angle between the fluid FLT and the central axis 25, which is 90 degrees in this embodiment, is larger than the angle between the fluid FLF and the central axis 25, which is 45 degrees in this embodiment. Clearly, in alternative embodiments the first and second nozzles may be configured inject fluid at angles other than 90 degrees and 45 degrees. For example, the first nozzle may be configured to direct the fluid FLT slightly upwardly, rather than at 90 degrees, so that the fluid FLT reaches even higher up the teat of the animal.

Further embodiments falling within the scope of the appended claims will also be apparent to the skilled person.

The invention claimed is:

1. A teat cup comprising:
  a flexible liner for engaging about a teat of an animal to be milked, the liner comprising a head portion at one end of the liner, an injector for injecting fluid into the head portion of the liner, and a milk discharge passageway at another end of the liner,
  wherein:
    the head portion of the flexible liner is provided with a cavity and a mouth, the teat being receivable in the cavity and engageable with the liner through the mouth of the head portion,
    the injector comprises first and second passageways, the first passageway being oriented in a first injection direction, and the second passageway being oriented in a second injection direction different from the first injection direction;
    the injector comprises an inlet and a gravity biased diverter, whereby fluid flowing into the inlet is injected out of the injector and into the cavity of the head portion in one of the first and second injection directions, the gravity biased diverter being configured to switch the fluid flow between the first and second injection directions based on an orientation of the teat cup,
    a central axis of the liner defines an axial direction extending from the head portion towards the discharge passageway, and
    a first angle between the first passageway oriented in the first injection direction and the central axis is larger than a second angle between the second passageway oriented in the second injection direction and the central axis.

2. The teat cup of claim 1, wherein:
  the injector comprises first and second nozzles which inject the treatment fluid into the head of the liner;
  the first nozzle is located within the first passageway; and
  the second nozzle is located within the second passageway.

3. The teat cup of claim 2, wherein the gravity biased diverter is configured to divert the fluid to the first nozzle rather than the second nozzle when the teat cup is a normal orientation with the mouth above the milk discharge passageway, and to divert the fluid to the second nozzle rather than the first nozzle when the teat cup is in an inverted orientation with the mouth below the milk discharge passageway.

4. The teat cup of claim 2, wherein the gravity biased diverter comprises a valve element which moves under the influence of gravity to selectively unblock one of a first passageway to the first nozzle and a second passageway to the second nozzle.

5. The teat cup of claim 4, wherein the valve element is a ball which moves under the influence of gravity between a first valve seating at an entrance to the first passageway and a second valve seating at an entrance to the second passageway.

6. The teat cup of claim 5, wherein the ball is retained in diverter valve cavity having the first and second valve seatings at opposing ends of the diverter valve cavity, and wherein at least one paths are provided for fluids to enter the diverter valve cavity substantially mid-way between the first and second valve seatings.

7. The teat cup of claim 2, wherein at least one of the first and second nozzles comprises a plurality of exit holes through which the fluid is injected.

8. The teat cup of claim 7, wherein the exit holes of each plurality of exit holes are spaced apart from one another along a circumference around the central axis.

9. The teat cup of claim 1, wherein:
  the first passageway is perpendicular to the axial direction, and
  the second passageway is extends, at the second angle, towards the milk discharge passageway of the liner.

10. The teat cup of claim 1, further comprising a fluid delivery tube that is connected to the injector and which allows fluid delivery to the injector, and a non-return valve mounted in the injector which controls the fluid delivery from the fluid delivery tube.

11. The teat cup of claim 10, wherein the injector comprises a housing having the gravity biased diverter and the non-return valve, the non-return valve mounted at an inlet of the injector where the fluid delivery tube is connected to the injector.

12. The teat cup of claim 11, wherein the non-return valve comprises a return spring that is rated to admit the fluid to the gravity biased diverter when greater than a predetermined fluid pressure differential occurs between the head portion of the liner and the fluid delivery tube.

13. The teat cup of claim 1, wherein:
the injector further comprises:
a housing,
a diverter valve ball, and
an insert, and
the gravity biased diverter is defined by a positioning of the housing relative to the insert so as to define a gravity biased diverter cavity and placement of the diverter valve ball within the gravity biased diverter cavity.

14. A method of milking an animal, the method comprising the steps of:
providing a teat cup comprising:
a flexible liner having a head portion at one end of the liner, an injector for injecting fluid into the head portion of the liner, and a milk discharge passageway at another end of the liner,
wherein:
the head portion of the flexible liner is provided with a cavity and a mouth, the teat being receivable in the cavity and engageable with the liner through the mouth of the head portion,
the injector comprises first and second passageways, the first passageway being oriented in a first injection direction, and the second passageway being oriented in a second injection direction different from the first injection direction;
the injector comprises an inlet and a gravity biased diverter, whereby fluid flowing into the inlet is injected out of the injector and into the cavity of the head portion in one of the first and second injection directions, the gravity biased diverter being configured to switch the fluid flow between the first and second injection directions based on an orientation of the teat cup,
a central axis of the liner defines an axial direction extending from the head portion towards the discharge passageway, and
a first angle between the first passageway oriented in the first injection direction and the axial direction is larger than a second angle between the second passageway oriented in the second injection direction and the axial direction,
applying the teat cup to a teat of an animal,
applying a vacuum to the liner via the milk discharge passageway during a milking cycle to aid extraction of milk,
injecting treatment fluid into the head portion via the injector once the milking cycle has been completed,
withdrawing the teat cup from the teat and allowing the teat cup to fall into an inverted position with the head portion beneath the milk discharge passageway, thereby switching the gravity biased diverter from injecting fluid in the first passageway to injecting fluid in the second passageway, and
injecting flushing fluid via the injector into a barrel portion of the liner between the head portion and the milk discharge passageway when the teat cup is in the inverted position.

* * * * *